United States Patent [19]
Kruckenberg

[11] 4,083,685
[45] Apr. 11, 1978

[54] PROCESS FOR DYEING SYNTHETIC FIBRE MATERIALS FROM AN ORGANIC WATER-IMMISCIBLE SOLVENT

[75] Inventor: Winfried Kruckenberg, Leverkusen, Germany

[73] Assignee: Bayer Aktiengesellschaft, Leverkusen, Germany

[21] Appl. No.: 703,013

[22] Filed: Jul. 6, 1976

Related U.S. Application Data

[63] Continuation of Ser. No. 474,990, May 31, 1974, abandoned.

[30] Foreign Application Priority Data

Jun. 2, 1973 Germany .............................. 2328160

[51] Int. Cl.$^2$ .......................... C09B 27/00; D06P 1/02
[52] U.S. Cl. .......................................... 8/41 R; 8/41 B; 8/41 C; 8/94 A; 8/162 R; 8/178 R; 8/179
[58] Field of Search .................... 8/41 R, 41 B, 41 C, 8/94 A

[56] References Cited

U.S. PATENT DOCUMENTS

| | | | |
|---|---|---|---|
| 2,238,486 | 4/1941 | Dickey et al. | 260/205 |
| 3,069,408 | 12/1962 | Merian | 260/158 |
| 3,740,189 | 6/1973 | Doss et al. | 8/26 |
| 3,773,750 | 11/1973 | Groebke et al. | 260/207.1 |
| 3,792,971 | 2/1974 | Neeff et al. | 8/39 |

FOREIGN PATENT DOCUMENTS

| | | |
|---|---|---|
| 1,360,450 | 5/1963 | France. |
| 1,061,926 | 7/1959 | Germany. |
| 1,810,063 | 6/1970 | Germany. |
| 2,145,412 | 3/1972 | Germany. |
| 6,703,009 | 2/1967 | Japan. |
| 1,468,908 | 3/1977 | United Kingdom. |
| 1,237,017 | 6/1971 | United Kingdom. |

*Primary Examiner*—A. Lionel Clingman
*Attorney, Agent, or Firm*—Plumley and Tyner

[57] ABSTRACT

Exhaustion process for dyeing synthetic fiber materials with dispersions of azo dyestuffs which contain carbamate groups, in organic water-immiscible solvents. The dyestuffs are distinguished by good drawing properties and good general fastness properties.

8 Claims, No Drawings

PROCESS FOR DYEING SYNTHETIC FIBRE MATERIALS FROM AN ORGANIC WATER-IMMISCIBLE SOLVENT

This is a continuation, of application, Ser. No. 474,990, filed May 31, 1974, now abandoned.

The invention relates to an exhaustion process for dyeing synthetic fibre materials, which is characterised in that dispersions of azo dyestuffs which contain at least one grouping of the formula

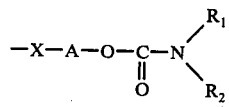

wherein

X denotes a direct bond or a bridge member,
A denotes an alkylene radical,
$R_1$ denotes hydrogen or alkyl and
$R_2$ denotes hydrogen, alkyl, cycloalkyl, aralkyl, OH, An optionally substituted amino group or aryl are used in organic water-immiscible solvents.

Suitable azo dyestuffs for this purpose are those of which the diazo component can belong either to the aromatic-carbocyclic or to the aromatic-heterocyclic series, and of which the coupling component is a benzene compound or heterocyclic compound customary in azo dyestuff chemistry.

The radical of the formula I which characterises the dyestuffs to be used can be present 1 to 3 times in the basic molecule.

Preferred radicals I are those with $R_1$ and $R_2$ = hydrogen.

The bridge members X are, for example, the following: $-NY-$, $-O-$, $-S-$, $-CO-$, $-CONY-$, $-SO_2-$ and $-SO_2NY$ wherein Y denotes hydrogen, optionally substituted alkyl or the radical

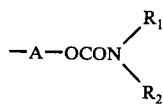

Suitable alkylene radicals A are straight-chain or branched $C_1-C_4$-alkylene radicals which can be interrupted by hetero-atoms, such as O and S, and can be substituted by nonionic substituents, such as OH, Halogen or

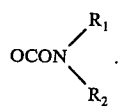

Suitable alkyl radicals $R_1$, $R_2$ and Y are those with 1 to 6 C atoms which are saturated or unsaturated and can be substituted, preferably monosubstituted by OH, halogen, CN, $C_1-C_4$-alkoxy or $C_2-C_5$-alkoxycarbonyl.

Suitable cycloalkyl radicals $R_2$ are cyclohexyl radicals which can optionally be substituted by methyl or chlorine.

Suitable aralkyl radicals $R_2$ are benzyl and phenylethyl radicals.

Suitable amino groups $R_2$ are those of the formula $-NR_3R_4$ wherein $R_3$ and $R_4$ denote hydrogen, $C_1-C_4$-alkyl or $C_1-C_4$-hydroxyalkyl and $R_4$ also denotes phenyl or tolyl.

Suitable aryl radicals $R_2$ are phenyl radicals which are optionally substituted by OH, $C_1-C_4$-alkyl, halogen or $C_1-C_4$-alkoxy.

By halogen there is preferably to be understood, within the scope of this invention, F, Br and above all Cl.

Azo dyestuffs to be used preferentially correspond to the formula

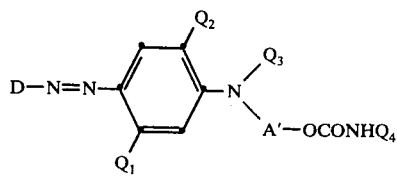

wherein

D denotes the radical of an aromatic-carbocyclic or aromatic-heterocyclic diazo component, $Q_1$ denotes hydrogen, $C_1-C_4$-alkyl, $C_1-C_4$-alkoxy, halogen, alkylcarbonylamino which is optionally monosubstituted by OH, halogen, CN or $C_1-C_4$-alkoxy, phenylcarbonylamino which is optionally monosubstituted to trisubstituted by $C_1-C_4$-alkyl, $C_1-C_4$-alkoxy, halogen or OH, formylamino or ureido, $Q_2$ denotes hydrogen, $C_1-C_4$-alkyl, $C_1-C_4$-alkoxy or halogen, $Q_3$ denotes hydrogen, $C_1-C_4$-alkyl which is optionally substituted by CN, Cl, $CONH_2$ or $C_1-C_2$-alkoxy, or denotes $-C_2H_4OCONHQ_4$, $Q_4$ denotes hydrogen, amino, $C_1-C_4$-alkylamino, $C_1-C_4$-hydroxyalkylamino, OH, methyl or hydroxyphenyl and $A'$ denotes $C_1-C_4$-alkylene, preferably $-C_2H_4-$.

$Q_2$ preferably represents H.

The radical D preferably represents a benzene or thiadiazole radical which is optionally substituted by non-ionic radicals, non-ionic radicals being understood both as the group

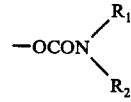

and as other radicals customary in dyestuff chemistry, such as Cl, Br, CN, $NO_2$, $C_1-C_4$-alkyl, $CONH_2$, $SO_2NH_2$ and $C_1-C_4$-alkylsulphonyl.

Dyestuffs which are very particularly suitable for the dyeing process according to the invention are those of the formula II, wherein D represents the radical

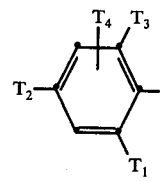

wherein $T_1$ denotes H, $NO_2$, CN, halogen or $CONH_2$, $T_2$ denotes H, $NO_2$, CN, $CONH_2$ or $SO_2NH_2$.

$T_3$ denotes H, $NO_2$, CN, halogen or $C_1-C_4$-alkylsulphonyl and $T_4$ denotes H or halogen.

Further dyestuffs to be used preferentially correspond to the formula $$Y_1-Ar-N=N-B-Y_2 \qquad (III)$$

wherein

Ar denotes a benzene-type diazo component which is free of ionic groups,

B denotes a heterocyclic coupling component of the pyrazolone, aminopyrazole, indole or imidazole series and $Y_1$ and $Y_2$ denote hydrogen or the —X—A—$OCONR_1R_2$ radical, but do not simultaneously denote hydrogen. The dyestuffs to be used according to the invention are largely known or easily obtainable according to known processes (U.S. Pat. No. 2,238,486, German Patent Specification No. 1,061,927, French Patent Specification Nos. 1,594,835, 1,360,450 and 2,079,167, German Offenlegungsschriften (German Published Specifications) No. 1,644,126 and 2,145,412, Japanese Patent Publication No. 3009/67 and British patent specification No. 1,237,017).

The dyeing of synthetic fibre materials from organic solvents by the so-called exhaustion process is generally known. Organic water-immiscible solvents which can be used are those of boiling point between 60° and 170° C, for example aliphatic chlorohydrocarbons or aliphatic fluorohydrocarbons and fluorochlorohydrocarbons, as well as aromatic chlorohydrocarbons and fluorohydrocarbons.

Tetrachloroethylene, trichloroethylene, 1,1,1-trichloroethane and 1,1,1-trichloropropane have proved particularly suitable. Mixtures of these solvents can also be used.

The dyeing liquors can contain up to 3 percent by weight of water, based on the weight of the organic solvents.

Furthermore, an addition of non-ionic auxiliaries to the dyeing liquors has proved of value in some cases. Non-ionic auxiliaries which can be used are in particular the known surface-active ethoxylation and propoxylation products of fatty alcohols, alkylphenols, fatty acid amides and fatty acids as well as their mixtures; the auxiliaries are employed in an amount of 0.05–2 percent by weight, based on the weight of the organic solvents. Instead of adding the auxiliaries directly to the dyeing liquors, they can also be used with advantage for pasting the dyestuffs containing carbamate groups, and can in this way be added to the dyeing liquors in the form of a dyestuff/auxiliary paste.

The synthetic fibre materials to be dyed according to the invention are above all fibre materials of aromatic polyesters, cellulose esters, polyacrylonitrile, synthetic polyamides and polyurethanes. The fibre materials can be in the most diverse stages of processing, for example in the form of filaments, flocks, tops, yarn, piece goods, such as woven fabric or knitted fabric, or made-up goods.

The dyeing according to the invention is preferably carried out in closed apparatuses, at temperatures of 60° to 170° C. The dyeing times lie between 5 and 90 minutes.

The dyestuffs, containing carbamate groups, to be used according to the invention are largely insoluble in the organic water-immiscible solvents. They are distinguished by good affinity and good general fastness properties.

A further subject of the present invention are new azo dyestuffs of the formulae a) (IV)

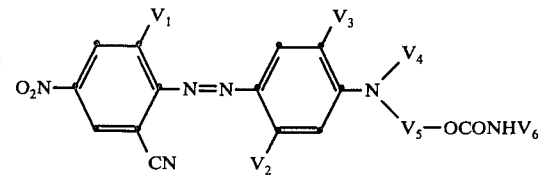

wherein $V_1$ denotes $NO_2$, CN, $C_1-C_4$-alkylsulphonyl, Cl, Br or H, $V_2$ denotes H, chlorine, methyl, methoxy or ethoxy, $V_3$ denotes H, methoxy or ethoxy, $V_4$ denotes $C_1-C_4$-alkyl, cyanoethyl or $-V_5$-$OCONHV_6$, $V_5$ denotes $C_1-C_4$-alkylene and $V_6$ denotes H or $C_1-C_4$-hydroxyalkyl;

b) (V)

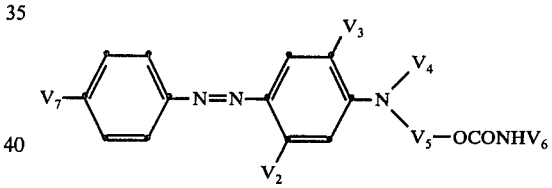

wherein $V_7$ represents carbamoyl or sulphamoyl and $V_2$-$V_5$ have the abovementioned meaning and $V_6$ represents H, methyl, ethyl, hydroxyethyl, phenyl, tolyl or hydroxyphenyl;

c) (VI)

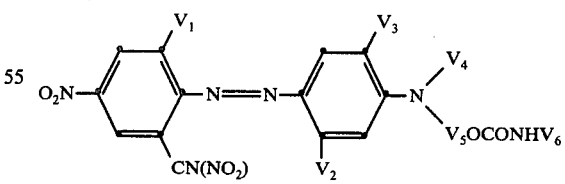

wherein $V_1$, $V_3$, $V_4$ and $V_5$ have the abovementioned meaning, $V_2$ represents formylamino, $C_2-C_5$-alkylcarbonylamino, $H_2NCONH$- or benzoylamino and $V_6$ represents H, methyl, ethyl or hydroxyethyl; and also d)

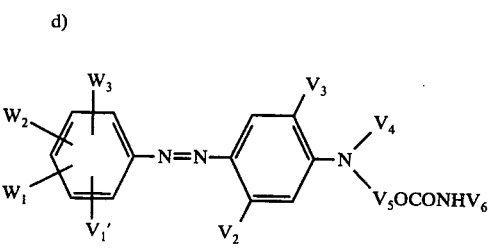
(VII)

wherein $V_1'$ represents CN, $W_1$ represents H, Cl, Br, CN, $CF_3$, $CH_3$, $OCH_3$ or $CONH_2$, $W_2$ represents H, Cl, Br, CN, $CF_3$ or $CH_3$, $W_3$ represents H or $CH_3$, $V_2$ represents H, Cl, $CH_3$, $OCH_3$, $OC_2H_5$, NHCHO, $C_2$–$C_5$-alkylcarbonylamino, $H_2$NCONH or benzoylamino, $V_3$ represents H, $CH_3$, $OCH_3$ or $OC_2H_5$, $V_4$ represents $C_1$–$C_4$-alkyl or $C_1$–$C_4$-alkoxy-$C_2$–$C_4$-alkyl radicals which are optionally substituted by 1 or 2 nitrile groups, or represents -$V_5$-OCONH$V_6$, $V_5$ represents $C_2$–$C_4$-alkylene which is optionally substituted by a further OCONH$V_6$ group and $V_6$ represents H, OH, $C_1$–$C_4$-hydroxyalkyl or $C_3$–$C_4$-dihydroxyalkyl.

Very particularly preferred new dyestuffs are ($a_1$) those of the formula IV, wherein $V_1$ represents Cl, Br, $NO_2$ or CN, $V_5$ represents -$C_2H_4$- and $V_4$ represents cyanoethyl or -$V_5$OCONH$V_6$ and the remaining radicals have the abovementioned meaning;

($a_2$) and also those of the formula IV, wherein $V_1$, $V_3$ and $V_6$ represent H, $V_2$ represents H or $CH_3$, $V_4$ represents cyanoethyl or $V_5$-OCONH$V_6$ and $V_5$ represents -$C_2H_4$-;

(b) those of the formula V, wherein $V_4$ represents cyanoethyl or -$V_5$-OCONH$V_6$, $V_6$ represents H and the remaining radicals have the abovementioned meaning;

(c) those of the formula VI, wherein $V_2$ represents acetylamino, $V_4$ represents cyanoethyl or -$V_5$-OCONH$V_6$, $V_5$ represents -$C_2H_4$- and $V_6$ represents hydrogen and the remaining radicals have the abovementioned meaning; and (d) those of the formula VII, wherein $V_1'$ is the o- or p-position to the azo bridge, $W_1$ denotes Cl or CN, $W_2$ denotes H, Cl or $CH_3$, $W_3$ denotes H or $CH_3$, $V_2$ denotes H, $CH_3$, formylamino, NHCONH$_2$ or acetylamino, preferably H, $V_3$ denotes H, $OCH_3$ or $OC_2H_5$, $V_4$ denotes $C_2H_5$, $C_2H_4$CN, $C_2H_4$O$C_2H_4$CN or $CH_2$CHCNCH$_2$CN, preferably $C_2H_4$CN, $V_5$ denotes —$C_2H_4$— and $V_6$ denotes H or $C_2H_4$OH.

The new dyestuffs are obtained according to methods which are in themselves known, for example by diazotising corresponding anilines and coupling with corresponding coupling components. Suitable diazo components are: 2-cyano-4-nitroaniline, 2,4-dicyanoaniline, 2,5-dicyanoaniline, 2,4-dicyano-6-chloroaniline, 2,4-dicyano-3,5-dimethylaniline, 2,5-dichloro-4-cyanoaniline, 2,4-dinitro-6-bromoaniline, 2,4-dinitro-6-chloroaniline, 2,4-dinitro-6-cyano-aniline, 2,6-dicyano-4-nitroaniline, 2-cyano-4-nitro-6-methylsulphonylaniline, 2-cyano-4-nitro-6-chloro-aniline, 2-cyano-4-nitro-6-bromo-aniline, 4-carbamoylaniline and 4-sulphamoylaniline.

Suitable coupling components are:

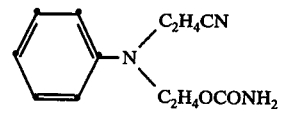

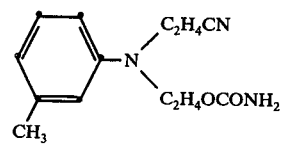

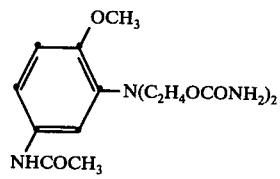

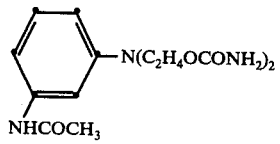

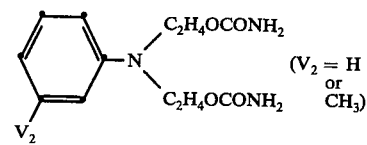

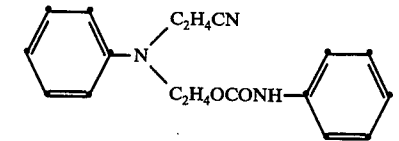

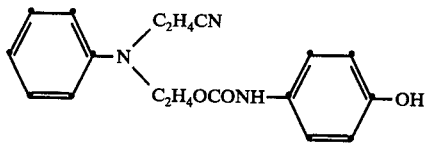

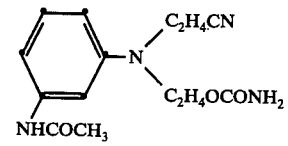

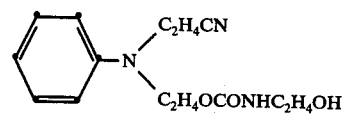

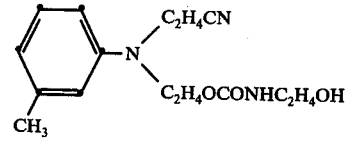

[Structure: phenyl-N(C2H5)(C2H4OCON(C2H4OH)2)]

[Structure: phenyl-N(C2H5)(C2H4OCONHC2H4OH)]

[Structure: phenyl-N(C2H5)(C2H4OCONH-phenyl-OH)]

[Structure: phenyl-N(C2H4OCH3)(C2H4OCONH2)]

The new dyestuffs can, however, also be obtained by, for example, reacting azo dyestuffs containing the grouping

—X—A—O—Z wherein
X and A have the abovementioned meaning and Z represents H with compounds of the formula $$O=C=N-R_4 \quad (VIII)$$

or of the formula $$Q-\underset{\underset{O}{\|}}{C}-NH-R_4 \quad (IX)$$

wherein
Q denotes chlorine or bromine and in the case that Z denotes phenoxycarbonyl, reacting with amines of the formula NHR$_1$R$_2$ in a manner which is in itself known (compare, for example, GB Pat. No. 1,241,705).

Those dyestuffs which contain nitrile groups in the 2,6-position of the diazo component are advantageously obtained by reaction of corresponding 2,6-dihalogenoazo dyestuffs with CuCN or CuCN-forming substances in aprotic polar organic solvents at temperatures of about 60°–120° C in a known manner (compare GB-PS No. 1,125,683).

The new dyestuffs are particularly suitable for dyeing the abovementioned types of fibres from organic solvents by the exhaustion process, and for the continuous dyeing of, preferably, polyester fibres with aqueous and non-aqueous padding liquors.

EXAMPLE I 100 parts of a polyethylene terephthalate fibre fabric are introduced into a dyebath which has been prepared from 1 part of the dyestuff of the formula

[Structure: O2N-phenyl(CN)-N=N-phenyl-N(C2H4OCONH2)2]

which has been brought to a finely divided state by grinding, and 1,000 parts of tetrachloroethylene. The bath is brought to 120° C, with vigorous agitation of the liquor, and is kept at this temperature for 30 minutes. After brief cooling, the liquor is separated off and the dyed goods are rinsed three times with fresh perchloroethylene at 60° C. After drying, a strong intense red dyeing of high colour yield and very good fastness to light and to washing is obtained.

EXAMPLE II 100 parts of a triacetate yarn are introduced into a dyebath which consists of 1 part of finely ground dyestuff of the formula

[Structure: O2N-phenyl(CN)-N=N-phenyl-N(C2H4CN)(C2H4OCONH2)]

and 1,000 parts of tetrachloroethylene. The dyebath is brought to 100° C with vigorous agitation of the liquor and is kept at this temperature for 30 minutes. After cooling, and rinsing the dyed goods with fresh tetrachloroethylene, a very strong red dyeing of good fastness to light and to washing is obtained.

EXAMPLE III 100 parts of texturised polyethylene terephthalate fibres are introduced into a dyebath which has been prepared from 1 part of finely ground dyestuff of the formula

[Structure: O2N-phenyl(NO2)(CN)-N=N-phenyl(OCH3)(NHCOCH3)-N-(C2H4OCONH2)2]

1,000 parts of tetrachloroethylene, 1 part of oleic acid ethanolamide, 1 part of oleyl alcohol eicosa-ethylene glycol ether and 6 parts of water.

The system is warmed to 120° C in a closed apparatus, with vigorous agitation of the liquor, and the fibres are dyed at this temperature for 30 minutes. After cooling to approx. 80° C and rinsing with fresh tetrachloroethylene at 60° C, a strong green dyeing of good colour yield and good fastness to light and washing is obtained.

EXAMPLE IV 100 parts of fibre yarn of poly-ε-caprolactam are introduced into a dyebath which contains 1 part of finely ground dyestuff of the formula

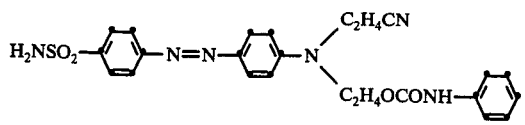

and 1,000 parts of tetrachloroethylene.

The bath is brought to 100° C with vigorous agitation of the liquor and is kept at this temperature for 30 minutes. After separating off the dyeing liquor and twice rinsing with fresh tetrachloroethylene, a very deep and fast yellow dyeing is obtained.

If the procedure in Example IV is followed and the dyestuffs listed below are used, valuable dyeings, in the indicated colour shades, are again obtained:

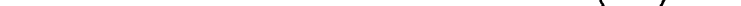

Colour shade: yellow

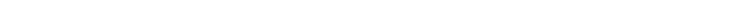 red

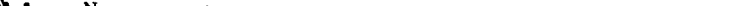 bluish-tinged red

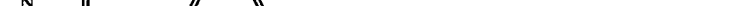 red

 green

 orange

 scarlet

 brown

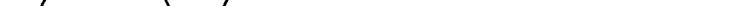 violet

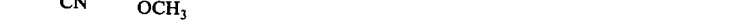 violet

-continued
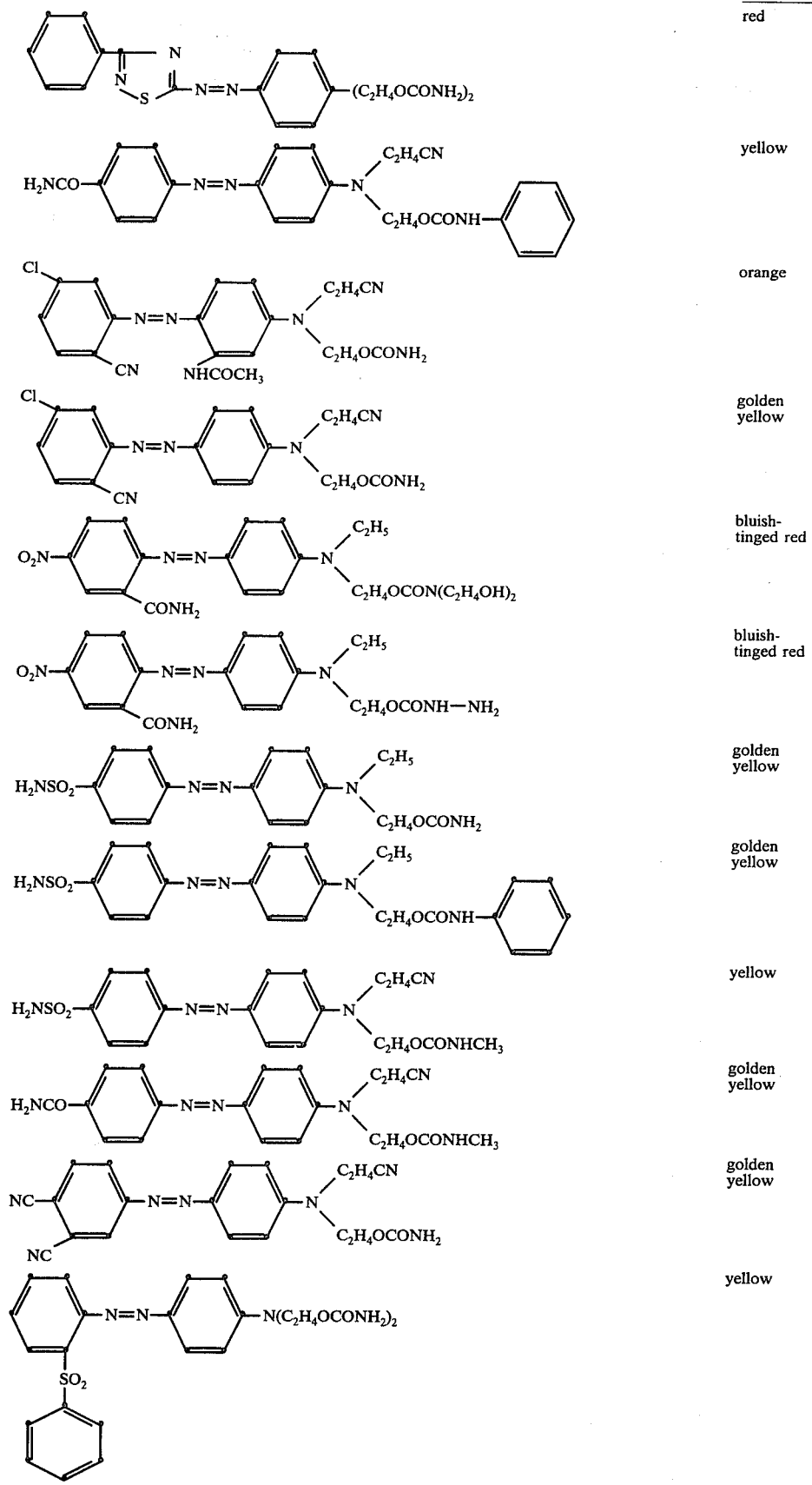
| | Colour shade: |
|---|---|
| | red |
| | yellow |
| | orange |
| | golden yellow |
| | bluish-tinged red |
| | bluish-tinged red |
| | golden yellow |
| | golden yellow |
| | yellow |
| | golden yellow |
| | golden yellow |
| | yellow |

-continued

| Structure | Colour shade |
|---|---|
| Dye with 2-Br-4,6-dinitrophenyl azo coupled to 4-methoxy-2-acetamido-5-[N(C₂H₄OCONH₂)₂]benzene | blue |
| 5-nitrothiazole azo to 4-[N(C₂H₄CN)(C₂H₄OCONH₂)]aniline | violet |
| 3-phenyl-1,2,4-thiadiazole azo to 4-[N(C₂H₄CN)(C₂H₄OCONH₂)]aniline | orange |
| 4-nitro-2-cyanophenyl azo to 3-acetamido-4-[N(C₂H₄CN)(C₂H₄OCONH₂)]aniline | bluish-tinged red |
| 4-nitro-2-carbamoylphenyl azo to 4-[N(C₂H₄CN)(C₂H₄OCONHC₆H₅)]aniline | reddish-tinged orange |
| 2,5-dichloro-4-cyanophenyl azo to 4-[N(C₂H₄CN)(C₂H₄OCONHC₂H₄OH)]aniline | orange |
| 2,5-dichloro-4-cyanophenyl azo to 4-[N(C₂H₄OCONH₂)₂]aniline | orange |
| 2,5-dichloro-4-cyanophenyl azo to 4-[N(C₂H₄CN)(C₂H₄OCONH₂)]aniline | orange |
| 4-(OC₂H₄HNCO-CONH₂)phenyl azo to 4-[N(C₂H₅)(C₂H₄OCONHC₆H₅)]aniline | yellow |
| 4-[(COOC₂H₄)₂NCO, NH₂]phenyl azo to 4-[N(C₂H₅)(C₂H₄OCONHC₆H₅)]aniline | yellow |
| 2-cyano-4-nitro-6-cyanophenyl azo to 4-[N(C₂H₅)(C₂H₄OCONH₂)]aniline | blue |
| 2,6-dicyano-4-nitrophenyl azo to 4-[N(C₂H₄CN)(C₂H₄OCONH₂)]aniline | claret |

-continued
| | Colour shade: |
|---|---|
| 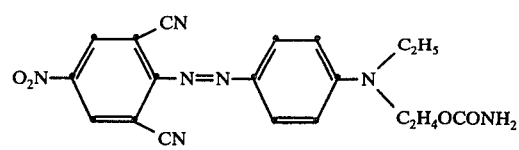 | blue |
| 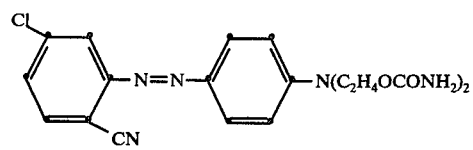 | orange |
| 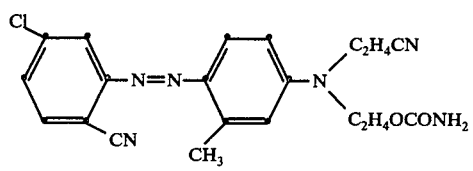 | orange |
| 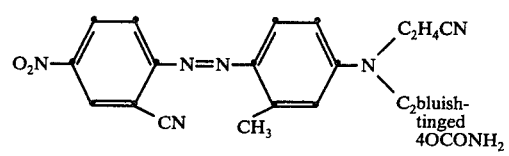 | bluish-tinged red |
| 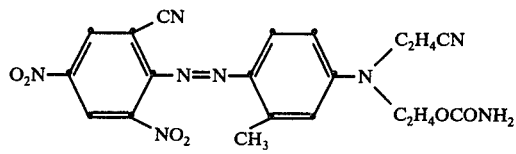 | violet |
| 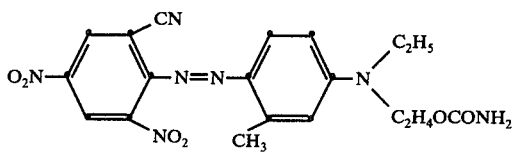 | blue |
| 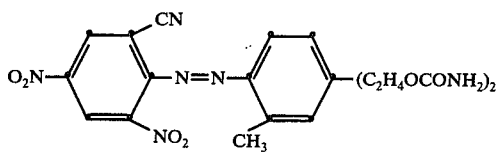 | blue |
| 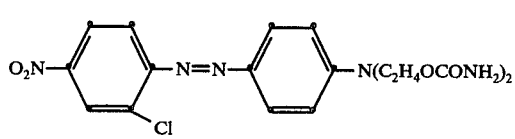 | orange |
| 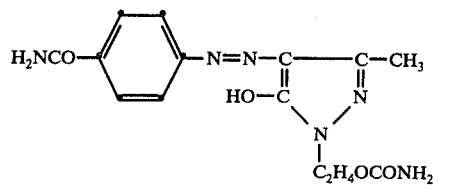 | yellow |
| 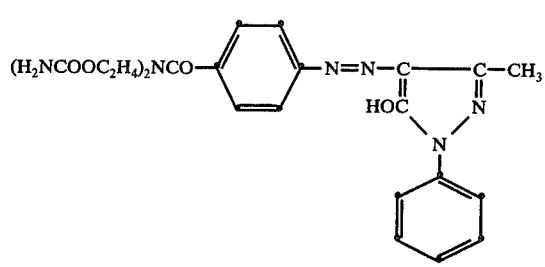 | yellow |

-continued
| | Colour shade: |
|---|---|
| 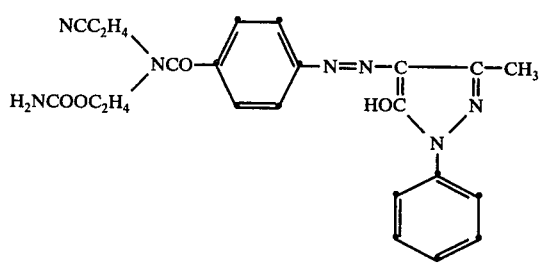 | yellow |
| 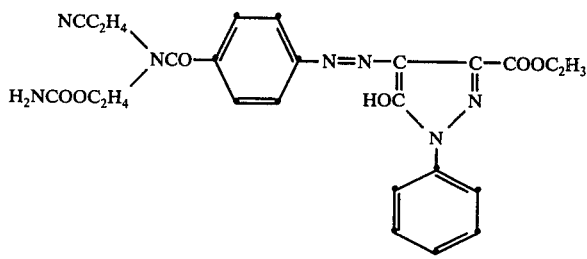 | yellow |
| 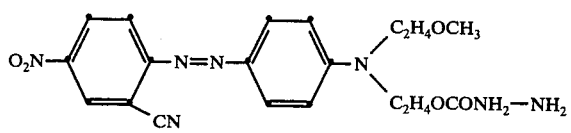 | bluish-tinged red |
| 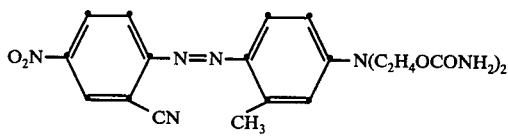 | bluish-tinged red |
|  | blue |
| 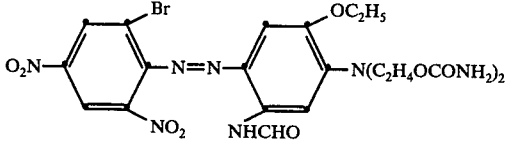 | blue |
| 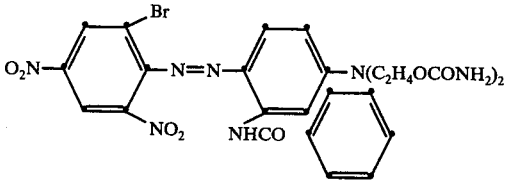 | violet |
| 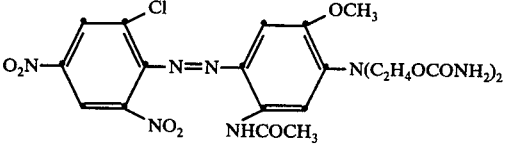 | blue |
| 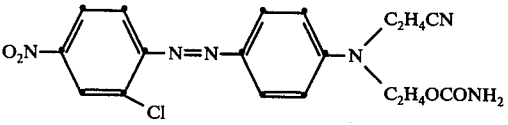 | orange |
| 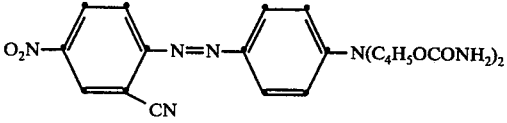 | red |

-continued
| | Colour shade: |
|---|---|
| 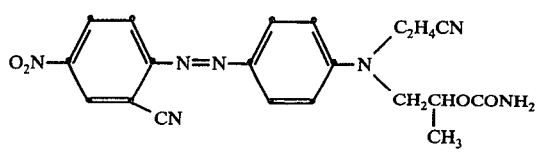 | red |
| 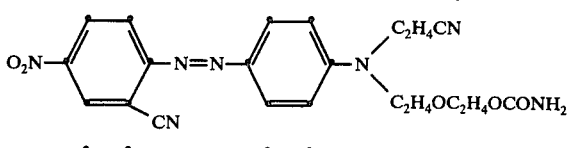 | red |
| 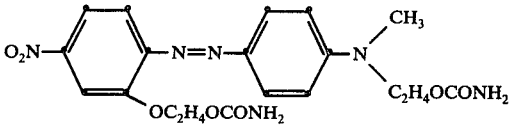 | red |
| 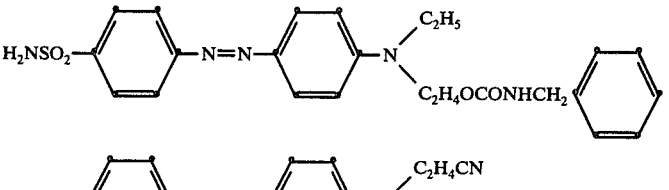 | yellow |
| 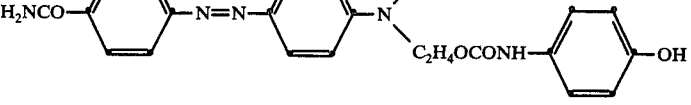 | yellow |
| 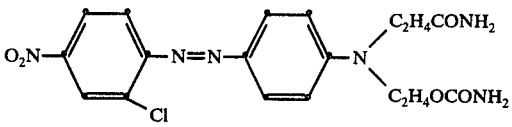 | orange |
|  | blue |
| 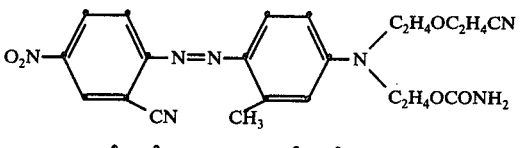 | bluish-tinged red |
| 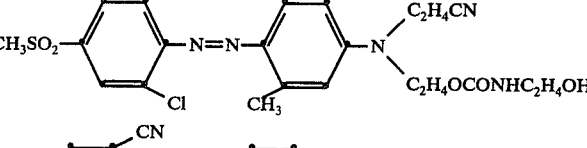 | orange |
| 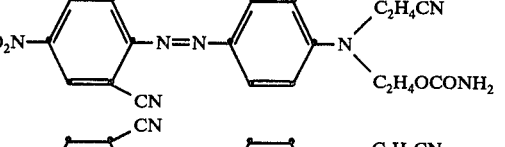 | bluish-tinged red |
| 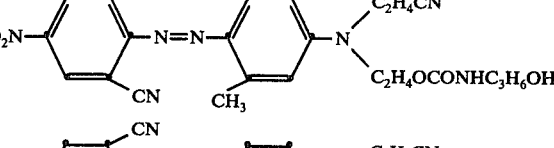 | violet |
| 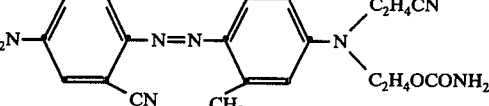 | violet |

-continued

| Structure | Colour shade: |
|---|---|
| 2,4-dinitro-6-cyanophenyl → azo → [4-N(C₂H₄CN)(C₂H₄OCONHC₂H₄OH), 3-NHCOCH₃]phenyl | blue |
| 2-nitro-4-nitro-6-cyanophenyl → azo → [4-N(C₂H₄OCH₂CN)(C₂H₄OCONH₂)]phenyl | red |
| 2,3-dicyano-5-nitrophenyl → azo → [4-N(C₂H₄OCONH₂)₂, 2-CH₃]phenyl | reddish-tinged blue |
| 2,3-dicyano-5-nitrophenyl → azo → [4-N(C₂H₄CN)(C₂H₄OCONHC₂H₄OH), 3-NHCOCH₃]phenyl | blue |
| 2,6-dicyano-4-nitrophenyl → azo → [4-N(C₂H₄CN)(C₂H₄OCONH₂), 3-NHCOCH₃]phenyl | blue |
| 2-cyano-4-nitrophenyl → azo → [4-N(C₂H₄CN)(C₂H₄OCONHC₂H₄OH), 3-NHCOCH₃]phenyl | ruby |
| 2-cyano-4-nitrophenyl → azo → [4-N(C₂H₄CN)(C₂H₄OCONH₂), 3-NHCOCH₃]phenyl | ruby |
| 2-cyano-4-nitro-6-bromophenyl → azo → [4-N(C₂H₄OCONH₂)₂, 3-NHCOCH₃]phenyl | reddish-tinged blue |
| 2-cyano-4-nitrophenyl → azo → [4-N(C₂H₄CN)(C₂H₄OCONHC₂H₄OH)]phenyl | red |
| 2-cyano-4-nitro-6-CF₃-phenyl → azo → [4-N(C₂H₄CN)(C₂H₄OCONH₂), 3-NHCOCH₃]phenyl | violet |
| 2-cyano-4-nitro-6-CF₃-phenyl → azo → [4-N(C₂H₄OCONHC₂H₄OH)₂, 2-CH₃]phenyl | violet |
| 2-cyano-4-nitro-6-CF₃-phenyl → azo → [4-N(C₂H₄CN)(C₂H₄OCONH₂)]phenyl | claret |

-continued
| Structure | Colour shade: |
|---|---|
| 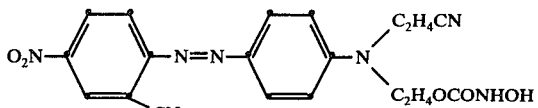 | red |
| 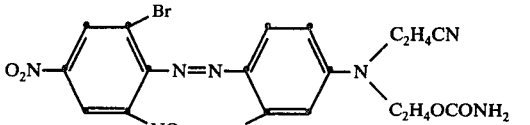 | violet |
| 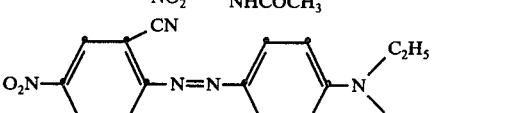 | blue |
| 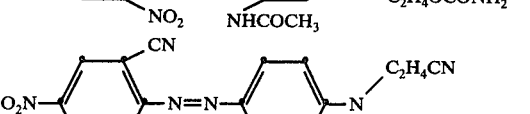 | blue |
| 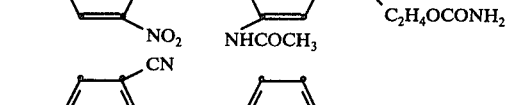 | red-violet |
| 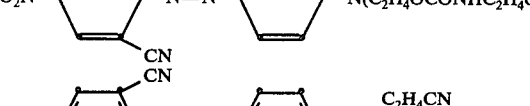 | bluish-tinged red |
| 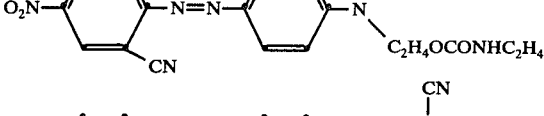 | red |
| 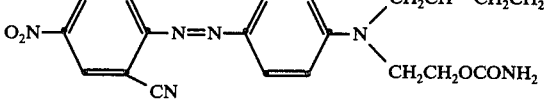 | bluish-tinged red |
| 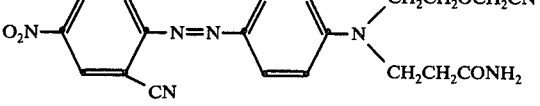 | bluish-tinged red |
| 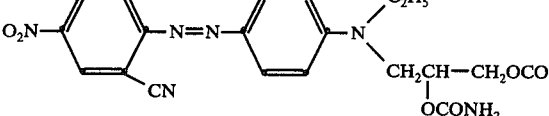 | red |
| 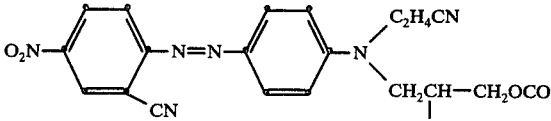 | violet |
| 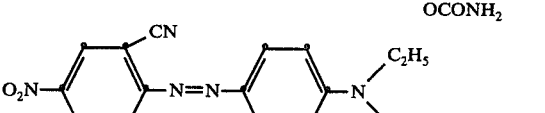 | red |

-continued

| | Colour shade: |
|---|---|
| 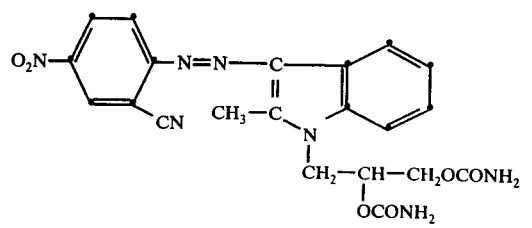 | yellow-brown |
| 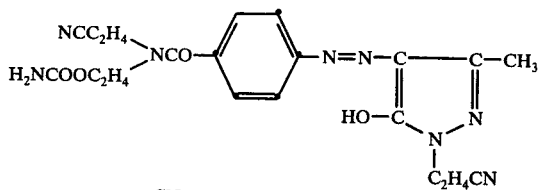 | yellow |
| 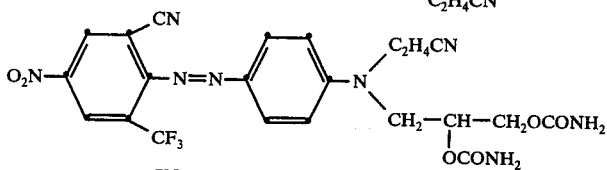 | violet |
| 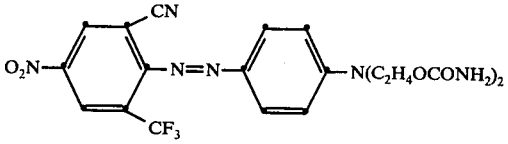 | violet |
| 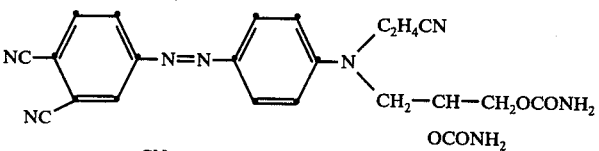 | golden yellow |
| 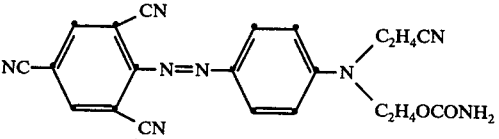 | ruby |
| 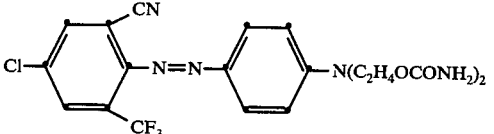 | red |
| 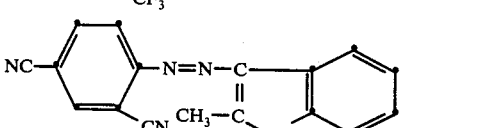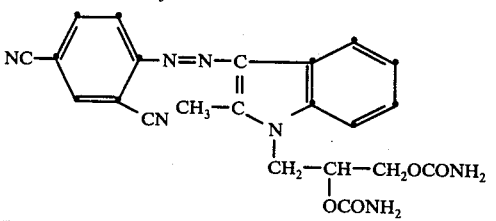 | yellow |

The abovementioned dyestuffs can be prepared in accordance with the following instructions:

EXAMPLE V 163 g (1 mol) of 2-cyano-4-nitroaniline are introduced, whilst stirring and cooling to below 10° C, into a mixture of 900 g (500 cm³) of concentrated sulphuric acid (66° Be) and 170 cm³ of nitrosylsulphuric acid (100 cm³ contain 42 g of nitrite), and diazotised therein. Duration approx. 2 hours. The resulting clear diazo solution is then allowed to run into 500 cm³ of water, to which 4,000 g of ice are added gradually, the solution being introduced in such a way that the temperature remains below 5° C. The slight excess of nitrite is destroyed with amidosulphonic acid. A solution of 267 g (1 mol) of N,N-bis-(-β-carbamoylethyl)aniline in 1,000 cm³ of water and 195 g (170 cm³) of 30% strength hydrochloric acid is then allowed to run in. The coupling of the dyestuff is complete in approx. ½ hour. The mixture is stirred for a further 2 hours and the product is then filtered off and washed until neutral. After drying, the yield is 420 g.

EXAMPLE VI 35 g of the compound of the formula

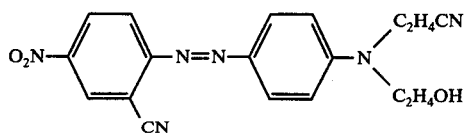

are dissolved in 100 g of anhydrous pyridine. 17 g of chloroformic acid phenyl ester are then slowly added at 0° C whilst stirring well, the mixture is stirred for a further two hours, excess ammonia gas is passed in, the whole is stirred at 40° for approx. 5 hours longer and is poured into water, and the pH is adjusted to 9–10 with NaOH. The dyestuff which precipitates is filtered off, washed until neutral and dried.

EXAMPLE VII 14.2 g of 2,4-dicyanoaniline are dissolved in 46 parts by weight of concentrated sulphuric acid to 0°–5° C and diazotised with 17.0 parts by weight of nitrosylsulphuric acid (42 g of nitrite in 100 cm$^3$) whilst stirring well, and cooling; after about 3 hours the mixture is poured onto approx. 300 parts by weight of ice, a slight excess of nitrite is removed with amidosulphonic acid and the solution is filtered. This solution is then combined with a solution of 20.4 g of the compound of the formula

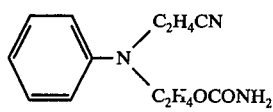

in hydrochloric acid, the mixture is partially neutralised with dilute sodium hydroxide solution (using Congo Violet) and the coupling is completed by means of sodium acetate. The dyestuff is filtered off and washed. In the dry state, it is a dark red powder which dissolves in organic solvents, such as acetone or alcohol, to give a scarlet colour.

EXAMPLE VIII 100 parts of a polyethylene terephthalate fibre fabric are introduced into a dyebath which has been prepared from 1 part of the dyestuff of the formula

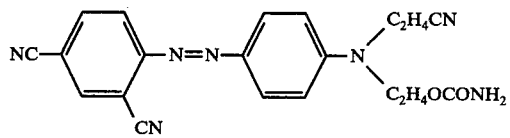

which has been brought to a finely divided state by grinding, and 1,000 parts of tetrachloroethylene. The bath is brought to 120° C whilst vigorously agitating the liquor and is kept at this temperature for 30 minutes. After brief cooling, the liquor is separated off and the dyed goods are rinsed three times with fresh perchloroethylene at 60° C. After drying, a strong intense scarlet dyeing of high colour yield and very good fastness to light and to washing is obtained.

EXAMPLE IX 100 parts of a triacetate yarn are introduced into a dyebath which consists of 1 part of finely ground dyestuff of the formula

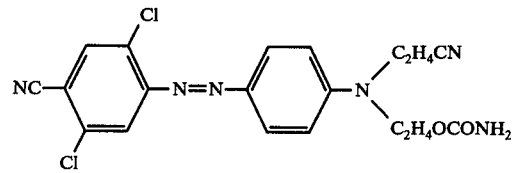

and 1,000 parts of tetrachloroethylene. The dyebath is brought to 100° C with vigorous agitation of the liquor and is kept at this temperature for 30 minutes. After cooling, and rinsing the dyed goods with fresh tetrachoroethylene, a very strong orange dyeing with good fastness to light and to washing is obtained.

EXAMPLE X 100 parts of texturised polyethylene terephthalate fibres are introduced into a dyebath which has been prepared from 1 part of finely ground dyestuff of the formula

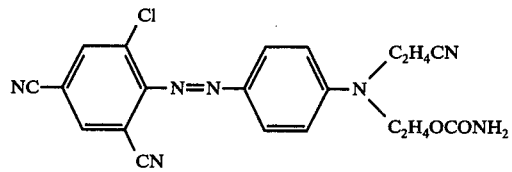

1,000 parts of tetrachloroethylene, 1 part of oleic acid ethanolamide, 1 part of oleyl alcohol eicosa-ethylene glycol ether and 6 parts of water.

The system is warmed to 120° C in a closed apparatus with vigorous agitation of the liquor, and the fibres are dyed at this temperature for 30 minutes. After cooling to approx. 80° C, and rinsing with fresh tetrachloroethylene at 60° C, a strong red dyeing of good colour yield and good fastness to light and to washing is obtained.

Comparably good results are obtained with the dyestuffs listed in the table which follows, which dye polyester fibres in the indicated colour shades.

|  | Colour shade |
|---|---|
| ![structure] NC—⟨⟩—N=N—⟨⟩—N(C₂H₄CN)(C₂H₄OCONH₂), with CN and CH₃ substituents | scarlet |

-continued
| | Colour shade |
|---|---|
| 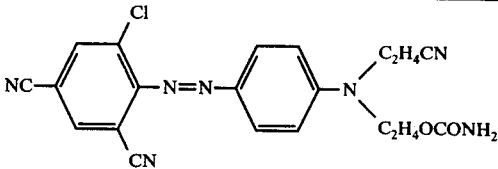 | scarlet |
| 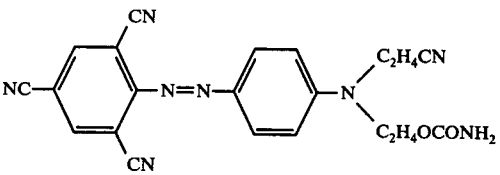 | red |
| 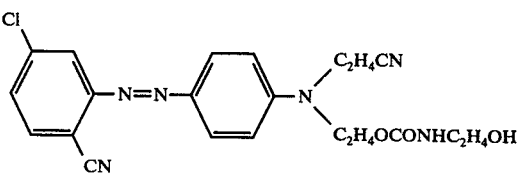 | orange |
| 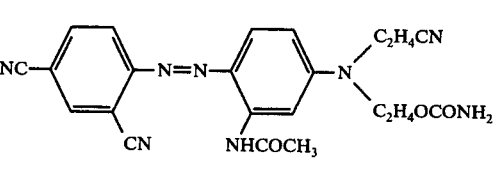 | red |
| 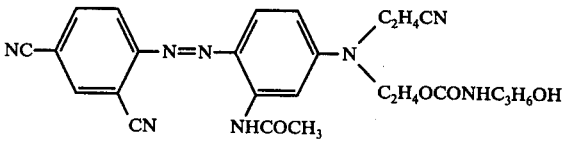 | red |
| 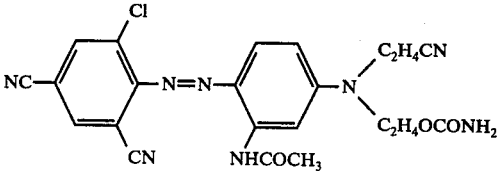 | bluish-tinged red |
|  | bluish-tinged red |
| 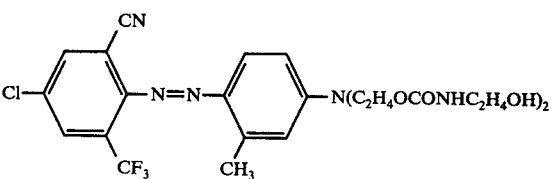 | bluish-tinged red |
| 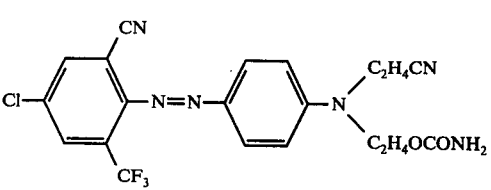 | bluish-tinged red |

-continued
| Structure | Colour shade |
|---|---|
| 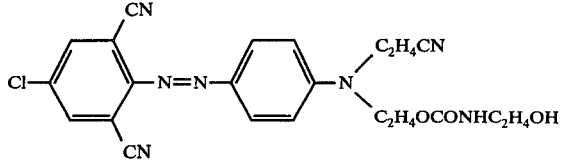 | bluish-tinged red |
| 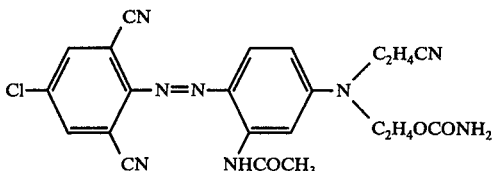 | ruby |
| 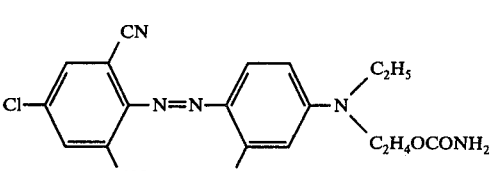 | red-violet |
| 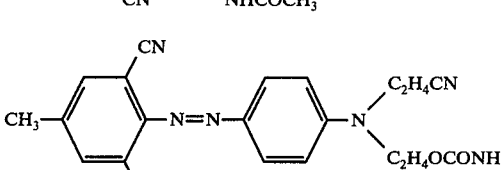 | orange |
| 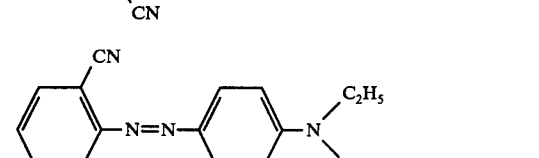 | orange |
| 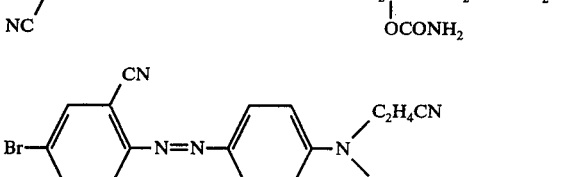 | orange |
| 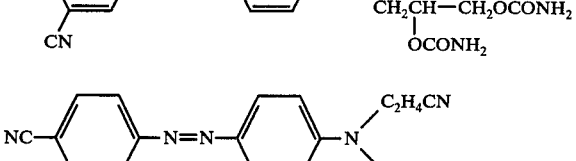 | scarlet |
|  | scarlet |
| 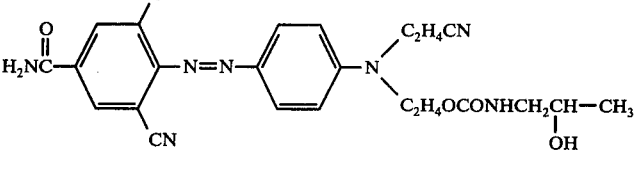 | orange |

-continued

| Structure | Colour shade |
|---|---|
| 2,4-dimethyl-3,6-dicyanophenyl–N=N–C₆H₄–N(C₂H₄CN)(C₂H₄OCONH₂) | orange |
| 2-cyanophenyl–N=N–C₆H₄–N(C₂H₄CN)(C₂H₄OCONH₂) | yellowish-tinged orange |
| 4-cyano-2-methoxyphenyl–N=N–C₆H₄–N(C₂H₄CN)(C₂H₄OCONH₂) | orange |
| 2,4-dicyanophenyl–N=N–C₆H₄–N(C₂H₄CN)(C₂H₄OCONHOH) | scarlet |
| 2,5-dichloro-4-cyanophenyl–N=N–C₆H₄–N(C₂H₄CN)(C₂H₄OCONH₂) | orange |
| 3,4-dicyanophenyl–N=N–C₆H₄–N(C₂H₄CN)(C₂H₄OCONHC₂H₄OH) | orange |
| 3-chloro-4-cyanophenyl–N=N–C₆H₄–N(CH₂CH(CN)CH₂CN)(C₂H₄OCONH₂) | orange |
| 2,5-dichloro-6-cyanophenyl–N=N–C₆H₄–N(C₂H₄OCONH₂)₂ | orange |
| 2,5-dichloro-4-cyanophenyl–N=N–C₆H₄–N(C₂H₄CN)(C₂H₄OCONHOH) | orange |
| 4-cyano-2-methylphenyl–N=N–C₆H₄–N(C₂H₄OCONH₂)₂ | orange |

| | Colour shade |
|---|---|
| 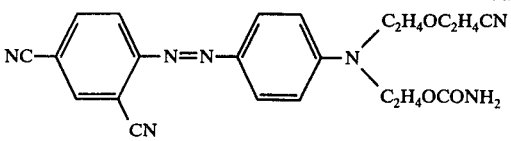 | yellowish-tinged red |
| 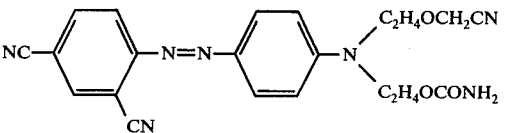 | yellowish-tinged red |
| 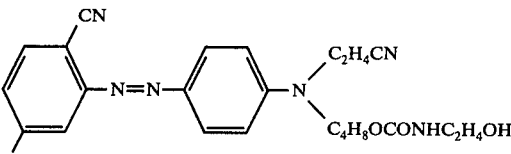 | orange |

EXAMPLE XI 100 parts of the dyestuff of the formula indicated in Example VIII, 40 parts of the reaction product of 1 mol of 2'-benzyl-4-hydroxy-diphenyl with 12 mols of ethylene oxide and 470 parts of water are ground together in a ball mill. 98 parts of the stable, finely disperse dyestuff paste thus obtained (dyestuff content: 16.4%) are diluted to 1 l with water. A polyethylene terephthalate fabric is padded with this dyestuff liquor; after squeezing out to a weight increase of 100%, drying at 80° C and thermosol treatment for 60 seconds at 190° C, the fabric is washed in tetrachloroethylene at room temperature and is then dried.

A scarlet dyeing of excellent rub resistance is obtained, with a high fixing yield.

EXAMPLE XII 100 parts of the dyestuff of the formula indicated in Example IX, 50 parts of the reaction product of 1 mol of pnonylphenol and 30 mols of ethylene oxide, and 480 parts of water are ground together. 98 parts of the stable, finely disperse paste (dyestuff content: 15.9%) are diluted to 1 l with water. A knitted polyethylene terephthalate fabric is impregnated with this dyeing liquor; after squeezing out to a weight increase of 100%, drying at 90° C and a dry heat treatment of 60 seconds at 200° C, the knitted fabric is washed with tetrachloroethylene at room temperature.

An even, brilliant orange dyeing of excellent rub resistance is obtained, with a high fixing yield.

I claim:

1. In a process for dyeing a synthetic fibre material from an organic water-immiscible solvent by the exhaustion process, the improvement comprising employing a dispersion of a dyestuff of the formula:

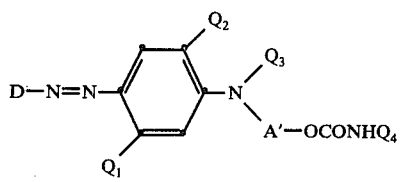

wherein

D is the radical of an aromatic carbocyclic or aromatic-heterocyclic diazo component;

$Q_1$ is hydrogen; $C_1$-$C_4$-alkyl; $C_1$-$C_4$ alkoxy; halogen; $C_2$-$C_5$ alkylcarbonylamino which is unsubstituted or substituted with hydroxyl, halogen, CN, or $C_1$-$C_4$-alkoxy; phenylcarbonylamino which is unsubstituted or mono-, di, or tri-substituted with $C_1$-$C_4$-alkyl; $C_1$-$C_4$-alkoxy, halogen, hydroxyl, formylamino, or ureido;

$Q_2$ is hydrogen, $C_1$-$C_4$-alkyl, $C_1$-$C_4$-alkoxy or halogen;

$Q_3$ is hydrogen, $C_2H_4OCONHQ_4$, $C_1$-$C_4$-alkyl which is unsubstituted or substituted with CN, Cl, -$CONH_2$ or $C_1$-$C_2$-alkoxy;

$Q_4$ is hydrogen, amino, $C_1$-$C_4$-hydroxyalkylamino, OH, methyl, or hydroxphenyl; and A' is $C_1$-$C_4$-alkylene; in the dyeing liquor.

2. The process of claim 1 wherein A' is —$C_2H_4$—.
3. The process of claim 1 wherein $Q_4$ is hydrogen.
4. The process of claim 1 wherein D is a radical of the formula

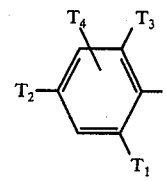

$T_1$ is H, $NO_2$, CN, halogen, or —$CONH_2$;
$T_2$ is H, $NO_2$, CN, $CONH_2$ or $SO_2NH_2$;
$T_3$ is H, $NO_2$, CN, halogen, or $C_1$-$C_4$-alkylsulfonyl; and
$T_4$ is H or halogen.

5. The process of claim 4 wherein $Q_1$ is formylamino.
6. In a process for dyeing a synthetic fibre material from an organic water-immiscible solvent by the exhaustion process, the improvement comprising employing a dispersion of a dyestuff of the formula:

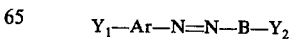

wherein

Ar is unsubstituted or substituted benzene free of ionic groups;

B is unsubstituted or substituted pyrazolone, aminopyrazole, indole, or imidazole; and $Y_1$ and $Y_2$ independently of one another are hydrogen or $-X-A-OCONR_1R_2$, wherein X is a direct bond or a bridging group, A is alkylene, $R_1$ is hydrogen or alkyl, and $R_2$ is hydrogen, alkyl, cycloalkyl, aralkyl, aryl or substituted or unsubstituted amino, with the proviso that $Y_1$ and $Y_2$ are not simultaneously hydrogen; in the dyeing liquor.

7. Process of claim 6 wherein $R_1$ and $R_2$ are hydrogen.

8. The process of claim 1 wherein said dyeing liquor further includes a non-ionic auxiliary or mixtures thereof in the amount of from about 0.05% to about 2% by weight of said organic solvent.

* * * * *